US009646391B2

(12) United States Patent
Ettelaie et al.

(10) Patent No.: US 9,646,391 B2
(45) Date of Patent: May 9, 2017

(54) NONINVASIVE LOCALIZATION OF ENTITIES IN COMPARTMENTED AREAS

(71) Applicant: REUNIFY LLC, Los Angeles, CA (US)

(72) Inventors: Emil Ettelaie, Los Angeles, CA (US); Jafar Adibi, Los Angeles, CA (US); Robert Willett, Eden Prairie, MN (US)

(73) Assignee: REUNIFY LLC, Santa Monica, CA (US)

( * ) Notice: Subject to any disclaimer, the term of this patent is extended or adjusted under 35 U.S.C. 154(b) by 193 days.

(21) Appl. No.: 14/563,283

(22) Filed: Dec. 8, 2014

(65) Prior Publication Data

US 2015/0163458 A1    Jun. 11, 2015

Related U.S. Application Data

(60) Provisional application No. 61/914,509, filed on Dec. 11, 2013.

(51) Int. Cl.
| | |
|---|---|
| *H04N 7/18* | (2006.01) |
| *G06T 11/00* | (2006.01) |
| *H04N 5/232* | (2006.01) |
| *G06K 9/46* | (2006.01) |
| *G06K 9/62* | (2006.01) |
| *G07C 9/00* | (2006.01) |
| *G06K 9/00* | (2006.01) |

(52) U.S. Cl.
CPC .......... *G06T 11/00* (2013.01); *G06K 9/00771* (2013.01); *G06K 9/6297* (2013.01); *G07C 9/00* (2013.01)

(58) Field of Classification Search
CPC .... G06K 9/00771; G06K 9/46; G06K 9/6256; G06K 9/6297; G07C 9/00; H04N 7/181
See application file for complete search history.

(56) References Cited

U.S. PATENT DOCUMENTS

| | | | | |
|---|---|---|---|---|
| 2006/0066719 A1* | 3/2006 | Haering | ............. | G06K 9/00771 348/143 |
| 2007/0285510 A1* | 12/2007 | Lipton | ............... | G08B 13/1961 348/135 |
| 2008/0159634 A1* | 7/2008 | Sharma | ............. | G06K 9/00771 382/224 |

* cited by examiner

*Primary Examiner* — Andy Rao
*Assistant Examiner* — Tyler Edwards
(74) *Attorney, Agent, or Firm* — Carlos R. Villamar; The Villamar Firm PLLC (57) ABSTRACT

A system, method and computer program product for locating entities in a compartmented area, including a plurality of sensors devices distributed throughout a plurality of compartments of an area, respectively, and configured to locate entities within each of the compartments of the area; a counting device configured to count a number of the located entities within each of the compartments of the area based on information gathered by the sensors devices; and a display device configured to display the located entries within each of the compartments of the area based on information gathered by the counting device.

18 Claims, 10 Drawing Sheets

NONINVASIVE LOCALIZATION OF ENTITIES IN COMPARTMENTED AREAS

CROSS REFERENCE TO RELATED DOCUMENTS

The present invention claims priority to U.S. Provisional Patent Application Ser. No. 61/914,509 of ETTELAIE et al., entitled "NONINVASIVE LOCALIZATION OF ENTITIES IN COMPARTMENTED AREAS," filed on Dec. 11, 2013, the entire disclosure of which is hereby incorporated by reference herein.

BACKGROUND OF THE INVENTION

Field of the Invention

The present invention relates generally to system and methods of localization, and more particularly to a system and method for locating entities in a compartmented area, with entities and areas, for example, including members in fitness clubs, guests in hotels, customers in warehouse stores, and the like.

Discussion of the Background

In recent years, systems and methods of localization have relied on either recognition of entities' inherent unique set of features, or tracking some recognizable device or marker attached to the entities. For example, facial features are captured and processed via a face detection unit to localize people, or people are asked to wear tracking devices. The first method often perform only if the entitles are positioned in a certain way, e.g., sitting in front of a camera for face detection. Human subjects might find the second method uncomfortable or unacceptable. It also relies on large arrays of tracking sensors.

SUMMARY OF THE INVENTION

Therefore, there is a need for methods and systems that address the above and other problems with systems and methods of localization. Provided are a system and method for locating entities in a compartmented area, with entities and areas, for example, including members in fitness clubs, guests in hotels, customers in warehouse stores, and the like. The localization process is achieved based on counting the entities in each compartment over time, and the like, and need not involve a tracking device, nor utilize invasive feature detection, and the like. Thus, an objective of this invention is to locate entities (e.g., people or objects) in the different parts of a compartmented area without using any invasive means, such as face detection or wearable tracking devices, and the like. Over time and through the process described, the system learns the preferences of entities towards any of the compartment areas. Using the preference for each entity, the system can locate the entities. Advantageously, the input information can include entity counts in each compartment, and a list of the entities present in the whole area, and the like.

Accordingly, in an illustrative aspect, there is provided a system, method and computer program product for locating entities in a compartmented area, including a plurality of sensors devices distributed throughout a plurality of compartments of an area, respectively, and configured to locate entities within each of the compartments of the area; a counting device configured to count a number of the located entities within each of the compartments of the area based on information gathered by the sensors devices; and a display device configured to display the located entries within each of the compartments of the area based on information gathered by the counting device.

The entities in the compartments of the area, include one of members in fitness clubs, guests in hotels, customers in warehouse stores, and objects in the compartments of the area.

The system, method and computer program product over time learn preferences of the entities located within the compartments in the area.

Based on the learned preferences for the entities, the system, method and computer program product locate the entities within the compartments in the area.

The system, method and computer program product are configured to display entity counts within each of the compartments of the area.

The system, method and computer program product are configured to generate a list of the entities present in the entirety of the area.

Still other aspects, features, and advantages of the present invention are readily apparent from the following detailed description, simply by illustrating a number of illustrative embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings, in which like reference numerals refer to similar elements, and in which.

DETAILED DESCRIPTION OF THE PREFERRED EMBODIMENTS

Generally, a method and system for locating returning entities in a general area with multiple subareas is presented here. The localization process, the employed system architecture, and related processes are described. The method relies on entity counts in subarea, and a general list of present entities in a main are. Therefore, the method avoids using invasive tracking means, and the like. The system and method learn tendencies of the entities towards different subareas, and uses such learned patterns to locate the entities at each point in time. Therefore, employed are a majority of entities having multiple presences over the course of time. The system and method then locate the entities and presents their location preferences.

Figure 1:
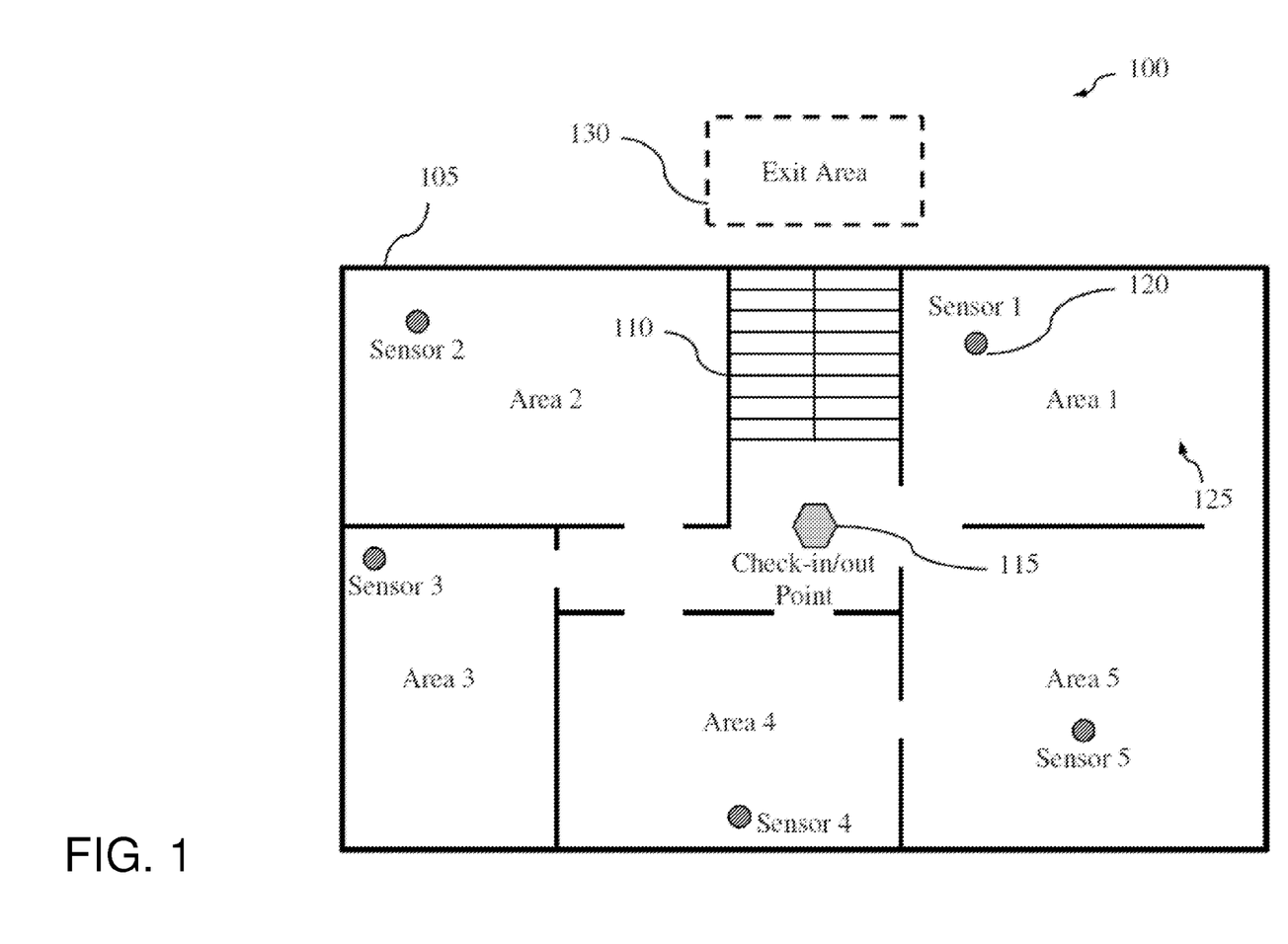
FIG. 1 shows an example of a general area that is divided into multiple compartments, with a sensing device employed in a main area and each one of its compartments.

Referring now to the drawings, and FIG. 1 thereof, there is shown an example of a general area that is divided into multiple compartments, with a sensing device employed in a main area and each one of its compartment. In FIG. 1, the system and method address the localization of entities in a divided area, as illustrated. A main area 105, for example, which can be a fitness club, hotel building, department store, and the like, is often consisting of some smaller subareas with specific purposes. For example, a fitness club can consist of a weight training room, a few racquetball courts, a cafeteria, and the like. Another example is a hotel with multiple guest rooms, a lobby, one or more restaurants, a bar, and the like.

Such divisions can be physical, e.g., by walls, or application based, e.g., separation of weight training and cardiovascular exercise subareas in the same room in a fitness club. The subareas can spatially be far apart, or even only exist in a virtual environment, such as a group of chat rooms in cyberspace, and the like.

A way of acquiring entities headcount in each subarea is employed. For example, in FIG. 1, the headcount in subarea 1, shown by 125, can be acquired by processing signals from a suitable sensor 1 depicted by 120. The counting method can depend on the nature of application, location, and the like. Some examples of such a method include, for example, processing signals from ceiling cameras or infrared sensors, door enter/exit sensors, manual counts by personnel, and the like.

Another employed piece of information is a list of the entities present in the main area, e.g., lists of members present in a fitness club, a list of guests in a hotel, and the like. Such information is usually available from a check-in/checkout point, depicted by 115, that registers the entry and/or exit of each entity. Such information can include a list of check-ins, checkouts, or both, and the like. For example, front desks of hotels register both check-ins, and checkouts, while in fitness clubs often only entries are registered via check-in at the front desks. Another example is the checkout points in department stores, where the exits are registered, and the entry information might not be available.

The exit information is also employed to compile the list of people present in the main area. However, such information is not crucial for the operation of the present system and method.

In the lack of exit information, the act of exiting the main area can be considered as moving to an imaginary exit subarea shown by 130. Locating an entity in the exit area 130 implies that the entity has exited the main area 105. Such entity will eventually be removed from the list of the present ones, after a certain lapse of time, when there is high enough confidence that the entity has actually left the main area.

Figure 2:
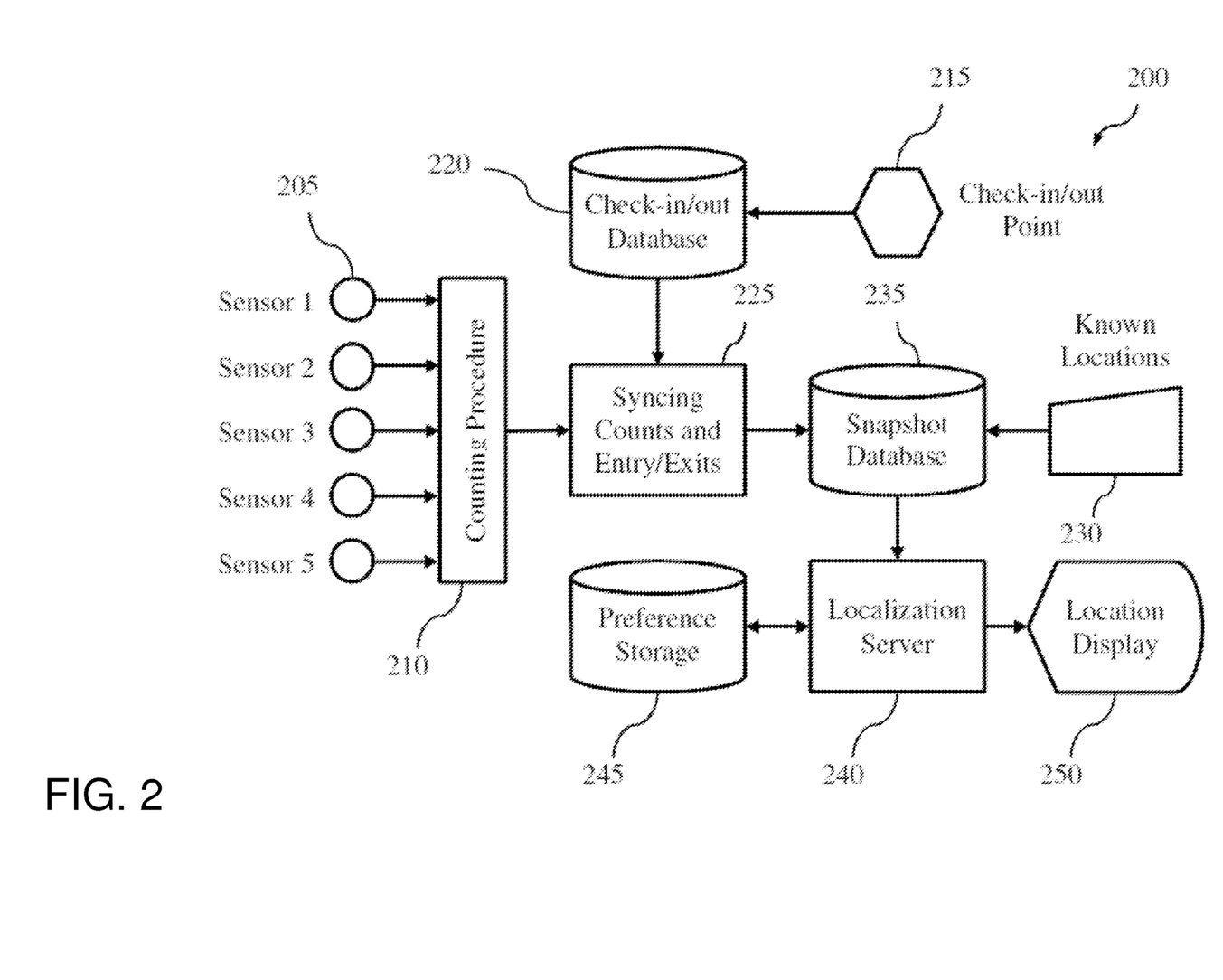
FIG. 2 is a block diagram of system components, and a general process through which they operate.

The system introduced in this invention is portrayed as block diagram in FIG. 2. Sensors such as 205 are located in each subarea and send signals. There can be a different number of sensors in one subarea, depending on the nature of the sensor, geometry of the subarea, application, and the like.

Such signals can directly indicate the number of entities in each subarea, however, often the headcounts can be extracted from such signals through some suitable processing. For example, in the case of human reporting, the signals, e.g., headcount reports can be used directly. For ceiling cameras, the video signals employ further processing for extracting the headcounts. A unit 210 encapsulates the headcount extraction process.

The entry and/or exit information is registered as in a check-in/out point depicted by 215. Such time-stamped data are stored in a database 220.

A block 225 shows a unit that synchronizes the entry/exit information from database 220, and the headcounts from the subareas produced by the processing unit 210. The output of the block 225 is in the form of snapshots taken in fixed time intervals, e.g., a snapshot sampling interval. Such interval is determined by the speed of changes in the subareas. For example, a 10-minute sampling interval can suffice for a fitness club, and the like. The snapshots are stored a database shown by 235, and include the list of entities checked in and/or out in a snapshot interval, and the subarea headcounts at the end of that interval.

It is also possible that the location is known for some of the present entities, e.g., people who have registered for a certain class in a fitness club. Another example is a guest who has placed an order to be served to them in a certain location of a hotel. Information about some of the locations of entities, if available, can help the process to locate the others with even higher accuracy. Therefore, the known locations, shown as 230, are also added to the snapshot database 235.

A localization server 240 running a suitable process infers locations of entities in each snapshot. The server 240 reads the snapshots from the database 235 as they become available, and produces the locations that can be presented to the user on a display, e.g., depicted by 250, or stored for later use, and the like.

The system and method also provide information about preferences of each entity with regard to each one of the subareas. Such information can be in the form of a discrete probability density for each entity, and can be stored in a database 245. Over time, and by using more snapshots, such information becomes more accurate. The localization server 240 reads back some of such data during operation.

Figure 3:
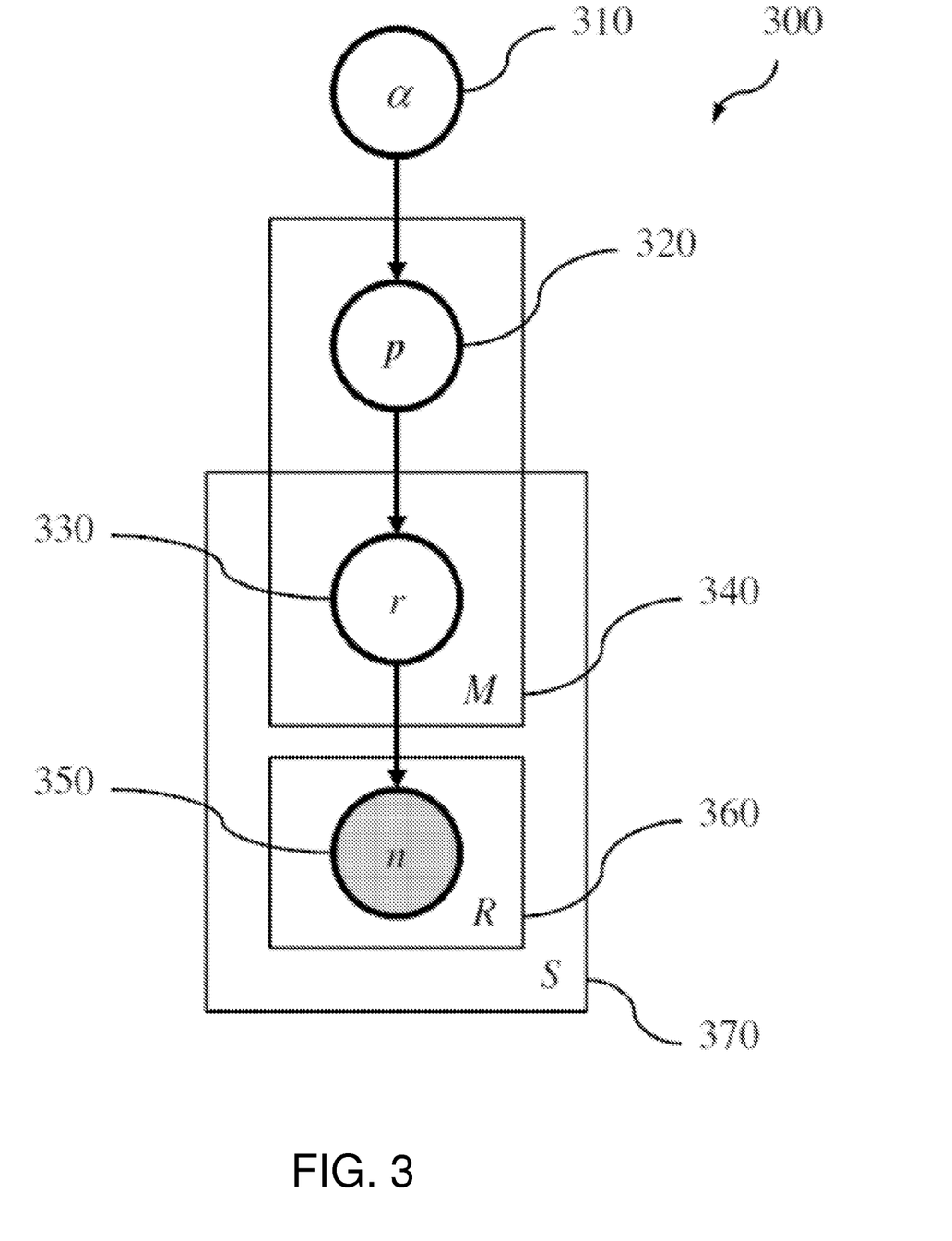
FIG. 3 is a Bayesian Network introduced to model locations of entities when their preferences do not change with time.
Figure 4:
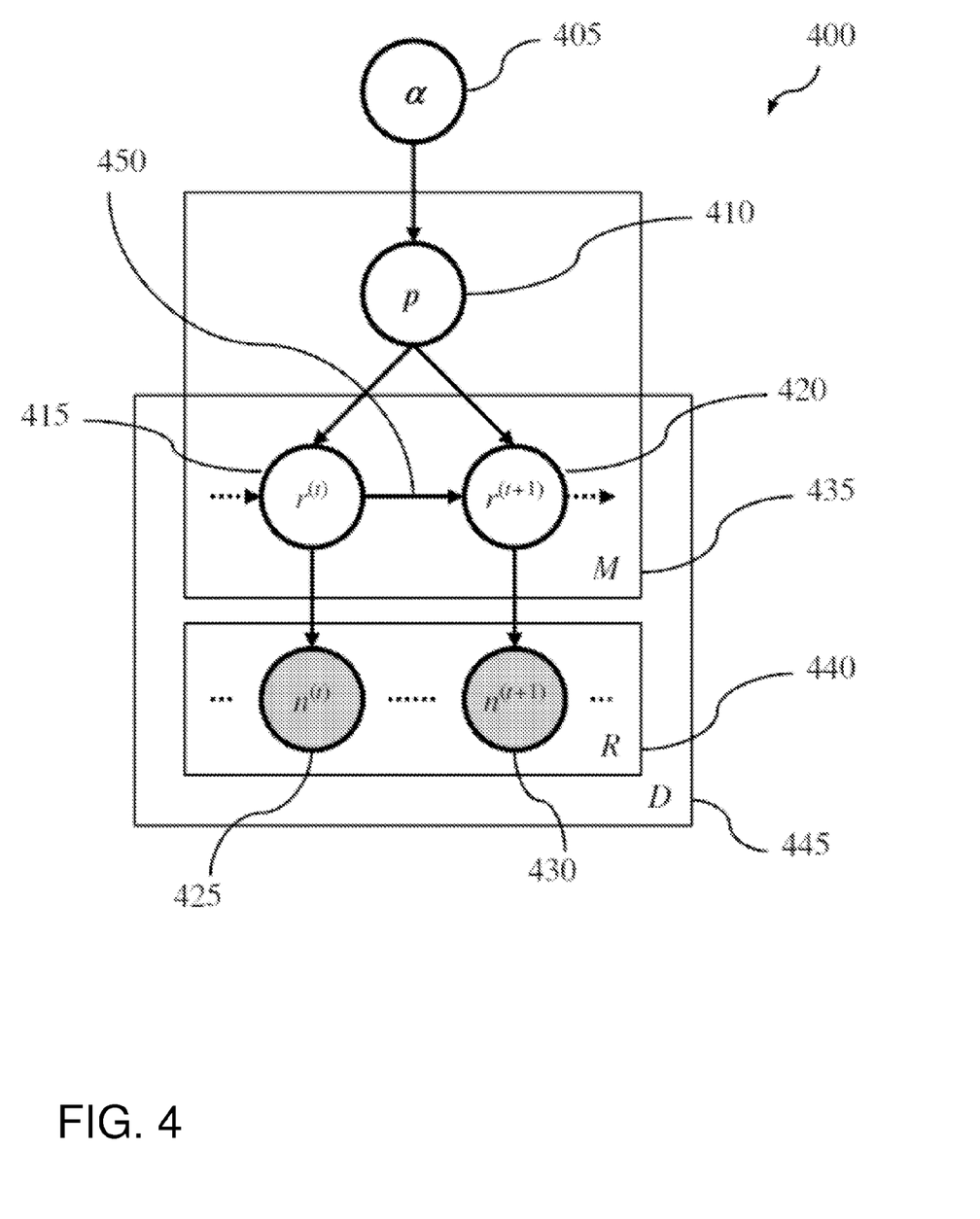
FIG. 4 is an extension of the model in FIG. 3 to a Dynamic Bayesian Network, such that it includes a case where locations of entities change during a course of a presence in an area, and dependent on previous locations at each point in time.
Figure 5:
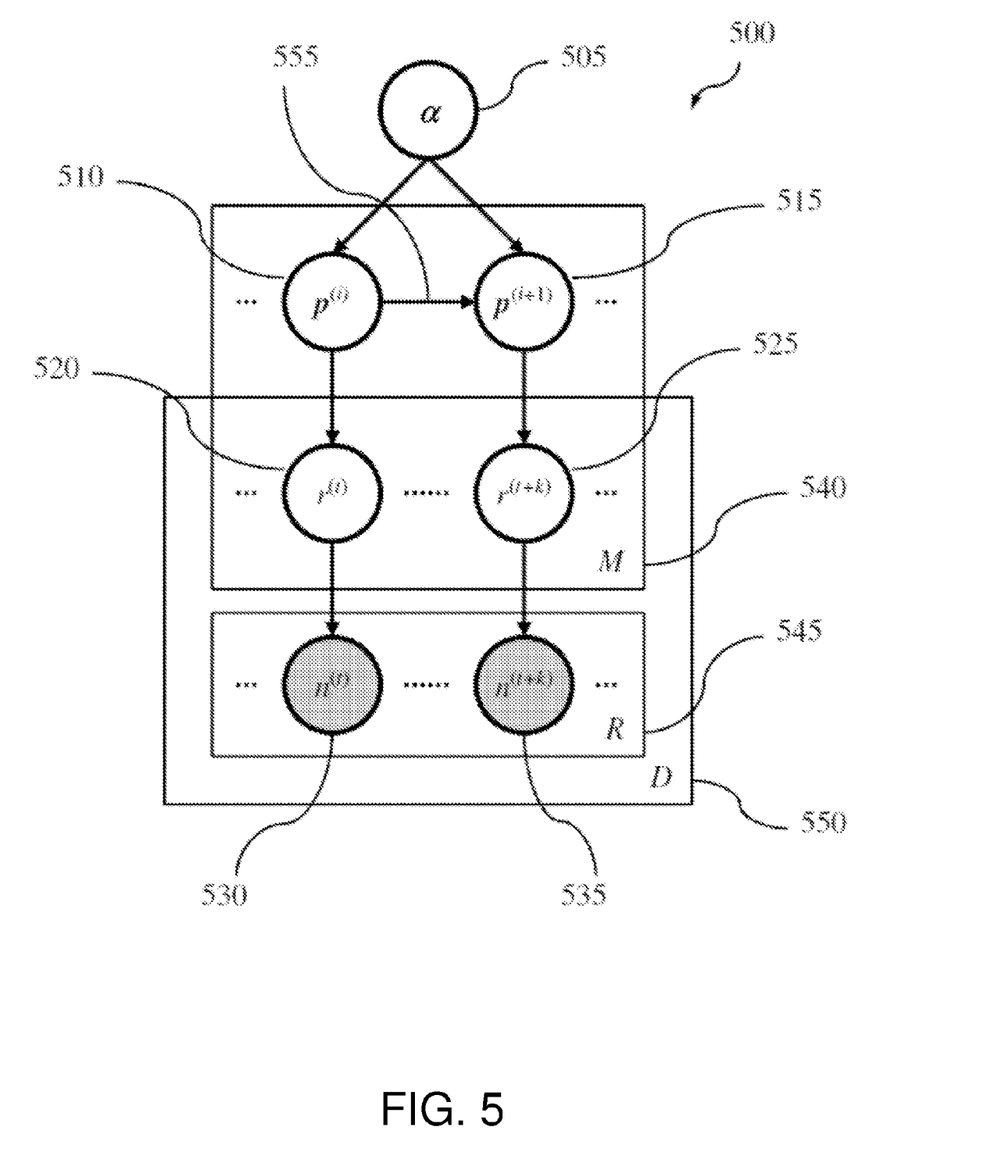
FIG. 5 is an extension of the model in FIG. 4 and illustrates a Dynamic Bayesian Network that models a case where preferences of entities also change during their presence in an area.

The localization process of the system and method can be based on generative models, illustrated as Bayesian Networks in FIGS. 3-5. For example, FIG. 3 is the abstract and static case in which the snapshots are independent, e.g., the entities and headcounts in one snapshot do not affect those of the subsequent snapshots. The process through which the entities are distributed in different subareas is modeled, as follows.

Each entity has a preference vector p shown as a latent variable by 320 in the Bayesian Network 300. For all the entities, the preference vector is randomly drawn from a single priori distribution. In our model, the prior is Dirichlet distribution with hyperparameter a shown by 310. Both a and p are R dimensional vectors, where R is the number of subareas.

The preference vector for each entity are the parameters for a Categorical distribution from which the entity's location is randomly drawn. Variable r shown by 330 is the outcome for a random draw, and can be any of the available subareas. For M users, the above subarea selection process is repeated M times as shown by box 340.

For every snapshot, the headcounts in each subarea depends on the location of each entity in that snapshot. The headcount is represented by n in 350, and since there are R subareas, the counting must be repeated R times, as indicated by box 360. Also, the box 370 points out the repetition of the whole process for S independent snapshots.

In reality, the independence of snapshots does not hold, and they are dependent throughout some durations of time. For example, when people check-in to a fitness club, they usually stay for some time (e.g., a few snapshots), but within the club they move around to access different facilities. Often, the current location of a member in a fitness club depends on that member's previous location. Therefore, a snapshot dependency throughout the operating hours of the club in a given day can be observed.

The abstract model of FIG. 3 is extended to a Dynamic Bayesian Network illustrated in FIG. 4. Here, instead of repeating the subarea selection process for each snapshot, as indicated by 370, the process is repeated by explicitly defining a location variable, e.g., 415 and 420, for each snapshot within the dependency duration. For example, arc 450 explicitly indicates the causal dependency of an entities location at time t+1 (or $r^{(t+1)}$ in 420) to its location in the previous snapshot, at time t represented by $r^{(t)}$ in 415.

In FIG. 4, throughout a dependency duration, headcounts at each sampling time are shown explicitly, e.g., 425 and 430. The box 445 shows the repetition of the whole selection process for each dependency duration, e.g., each day in a fitness club.

In some cases, the entities have a more consistent location pattern, during their presence. For such cases, another model illustrated in FIG. 5 can be employed that captures the consistency. Such Dynamic Bayesian Network model is also an extension of the model 400.

In the model of FIG. 5, entities have multiple preference vectors for different stages of their presence. For example, a fitness club member might often start their routine with cardiovascular exercise, and then move to a swimming pool. Therefore, their preference differs throughout their presence in the club. Examples of such stage-dependent preference vectors are shown by 510 and 515. Depending on the application, these vectors might be independent for a given entity. However, causal or non-causal dependencies can exist among such vectors in a general case. For example, the arc 555 shows a causal dependency between vectors 510 and 515 from two consequent stages i and i+1.

Figure 9:
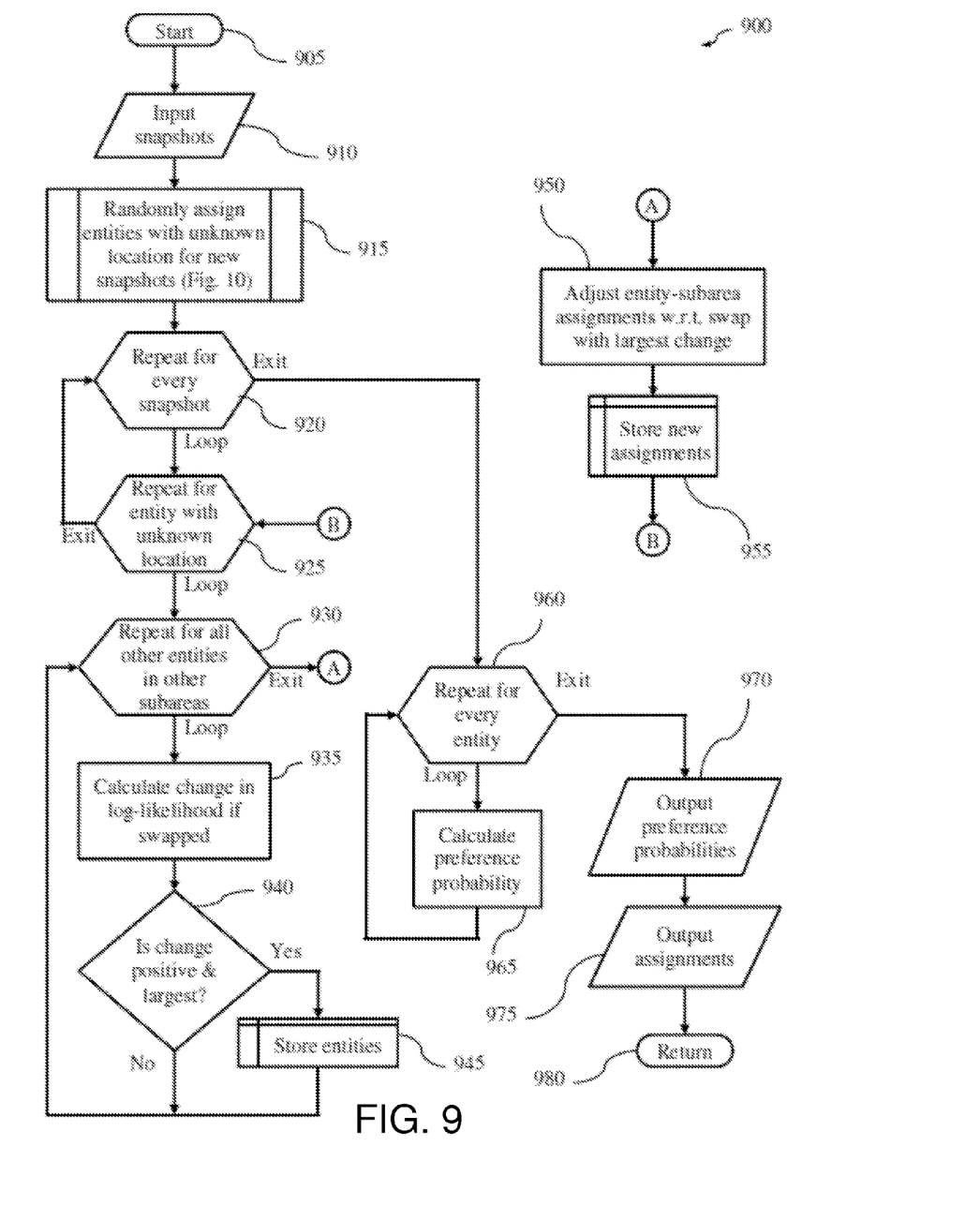
FIG. 9 is the flow chart of an Expectation Maximization process used for a localization task, with a less accurate outcome compared to the process of FIG. 8.

An adaptation of the Expectation-Maximization (EM) method is described in FIG. 9, as a more straightforward approach for inferring locations using the above models. However, higher location accuracy can be achieved by inference techniques based on Markov Chain Monte Carlo (MCMC) simulation. For that reason, as part of this invention, a new process is introduced.

To implement the Gibbs sampling method, all the transition probabilities for each state in the Markov Chain need be known. Otherwise, the random jump to the next state cannot be drawn. An example of such Markov Chain is partly illustrated in FIG. 6.

Since the headcount of entities are fixed for each snapshot, a transition resulting by allocating a single entity to a new subarea need not end up in a valid state. Arc 625 shows an example of such a transition, which leads to state 615, an invalid state due to its violation of the correct number of headcounts for subarea n. The invalid states and transitions are shown by broken lines in FIG. 6.

Figure 6:
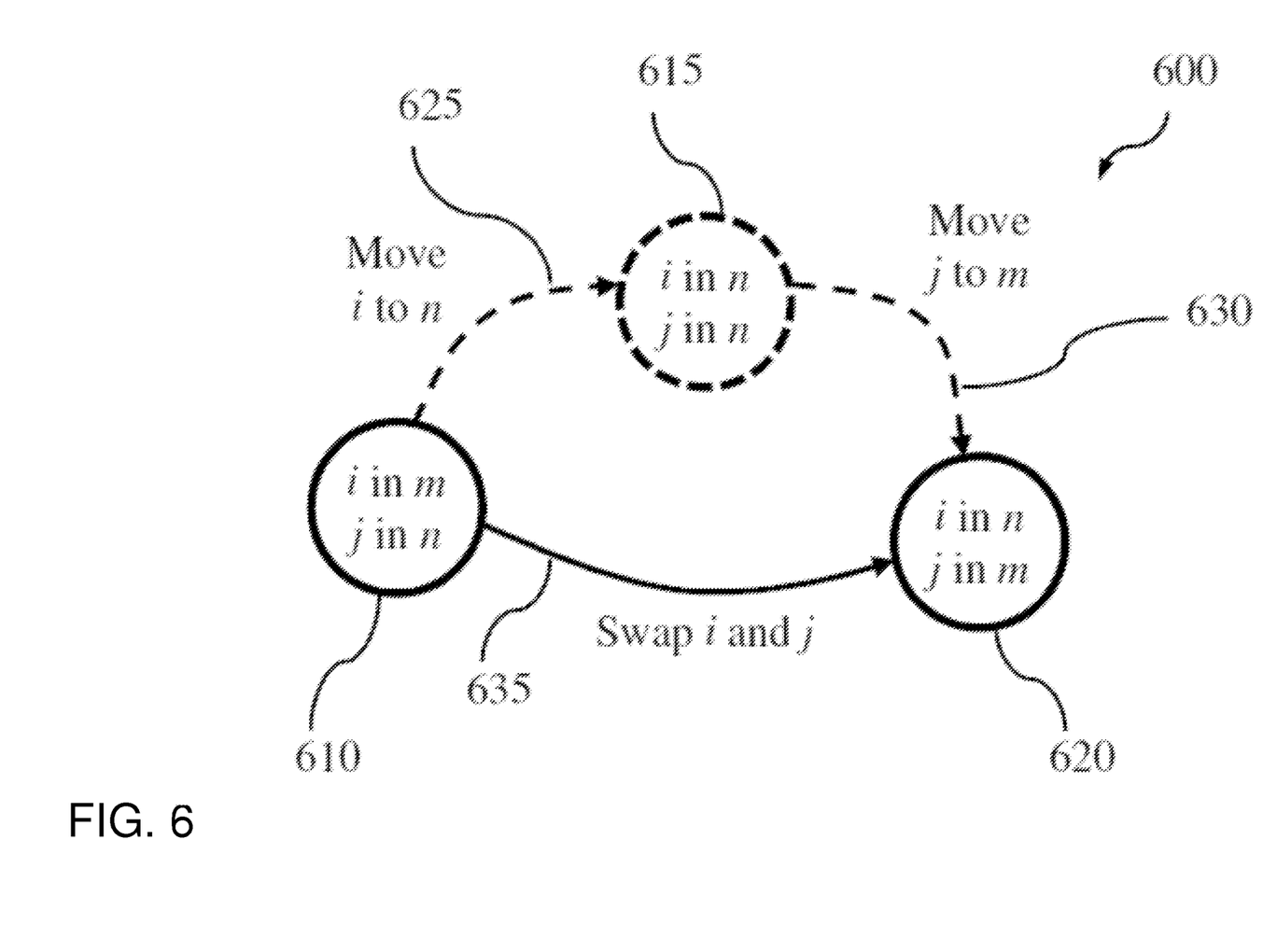
FIG. 6 illustrates a part of a Markov chain indicating a reason that inference methods based on conventional Gibbs sampling need not be employed for a problem solved, e.g., localization when a number of entities in each compartment is an only known fact.

The valid transitions, e.g., the one depicted by arc 635, need only be due to a location swap between two entities in two different subareas. Only such transitions can result in a valid state, e.g., 620. Therefore, any implementation of the Gibbs sampling method would only be possible if the probability of every possible swap is known. It is impossible to compute the normalization constant for swaps, due to the combinatorial increase in the number of involved factors. In fact, Gibbs sampling avoids such a level of complexity by restricting the transitions to one assignment change at a time, e.g., 625 and 630, which are not acceptable in the localization problem.

Figure 8:
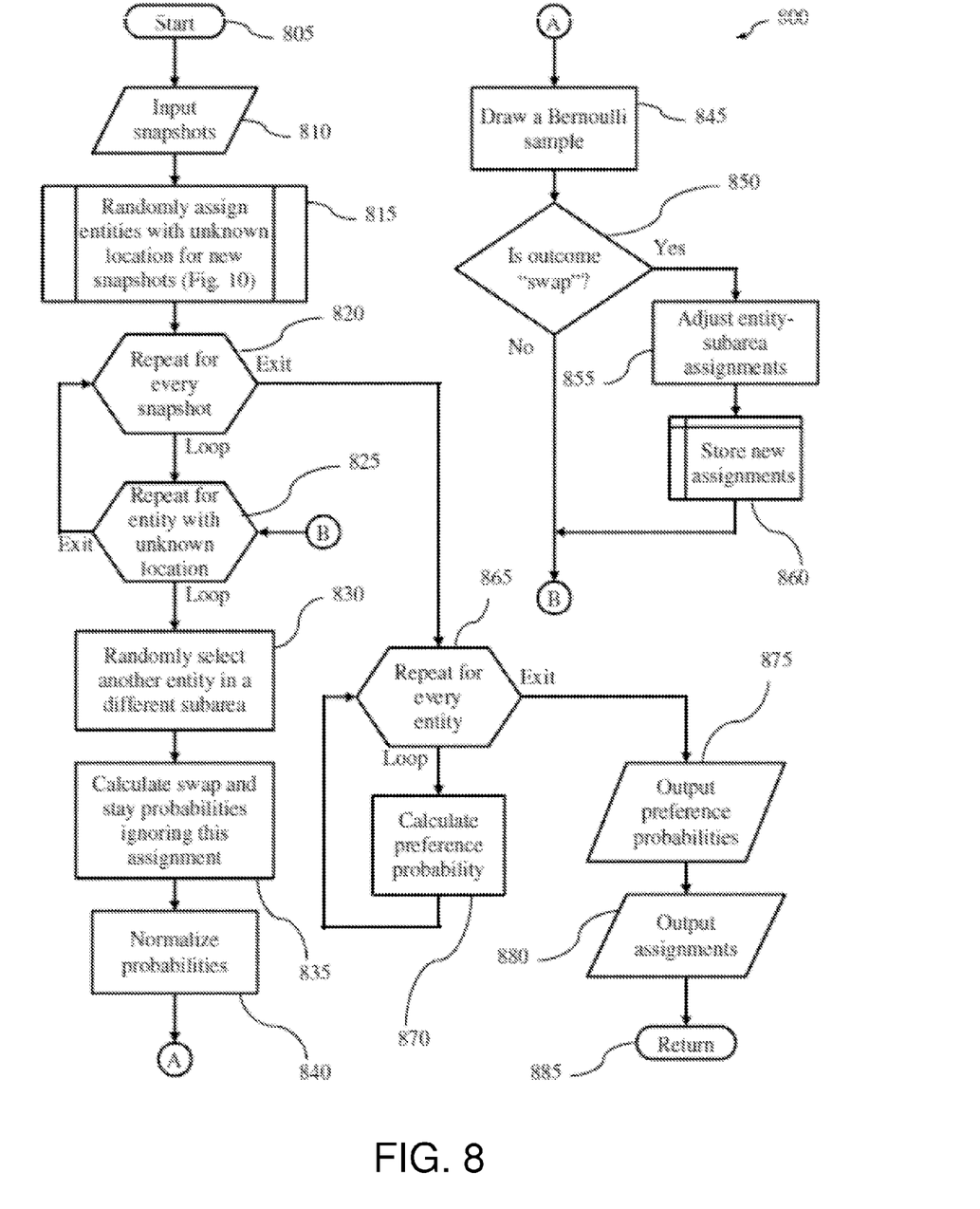
FIG. 8 is a flow chart of a localization process that is an extension to the conventional Gibbs sampling method.

In the described process of flowchart 800 of FIG. 8, the above problem is addressed by:

Random selection of a swap (e.g., uniformly), followed by, a random decision to whether go forward with it or not, based on the pre and post transition probabilities.

Figure 7:
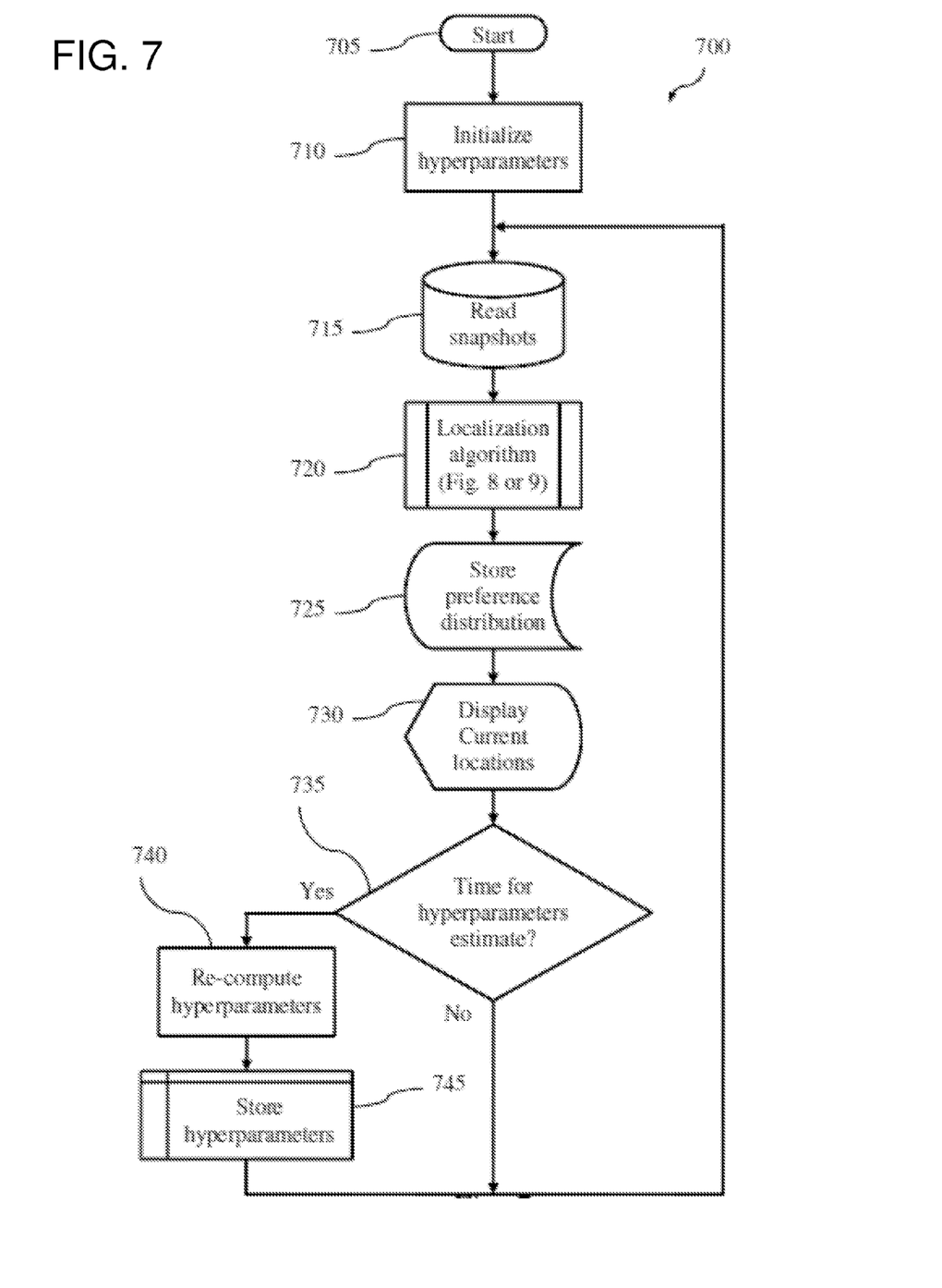
FIG. 7 is a flow chart illustrating a main localization process using the models shown in FIGS. 3-5.

FIG. 7 shows the flowchart of the main localization routine that runs on the server 240. As shown in step 710, the process starts with initialization of the Dirichlet hyperparameter, and continues with reading the snapshots from the database 235 in step 715. The snapshots are then fed to the localization process of FIG. 8 (or FIG. 9), in step 720. The output of 720 includes preference vectors of entities, along with their locations in corresponding snapshots, which are presented to the user in step 730. The preference vectors are stored for future analysis in step 725.

In step 735, a decision is made whether or not to run the hyperparameter estimation routine 740 followed by storing of hyperparameters in step 745. In either case, the current iteration is concluded, and a new one starts from step 715 by reading the updated snapshot data. The estimation routine can be run every few thousands of iterations.

Figure 10:
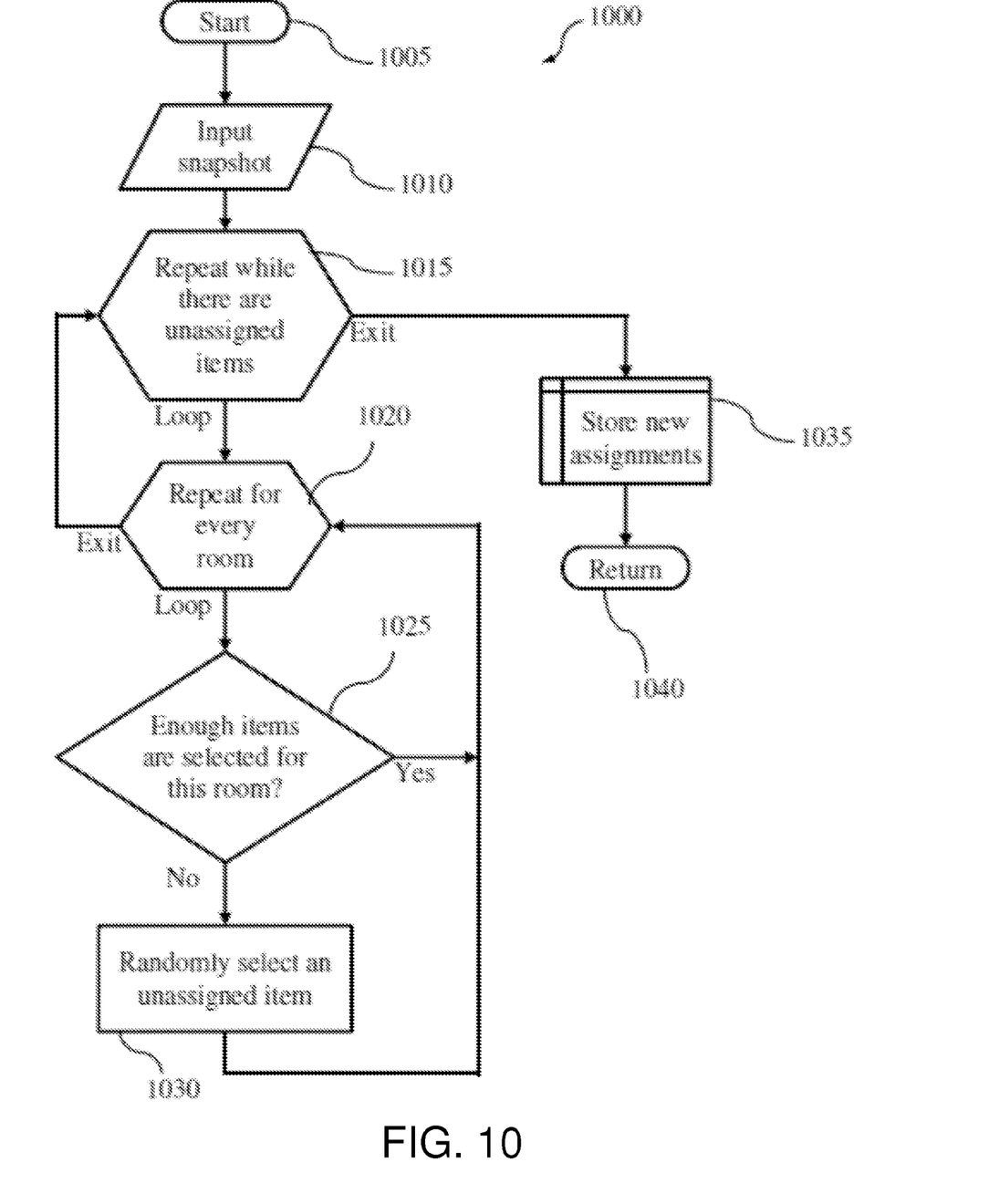
FIG. 10 is a flow chart of a random initialization subroutine used as a step in the localization processes of FIGS. 9 and 8.

FIG. 8 is the flowchart of our localization process 720 in FIG. 7. The process starts by reading the snapshots in step 810. For the new snapshots, the entities with unknown locations are randomly assigned to subareas in step 815. FIG. 10 is flowchart of the random initialization routine.

For every snapshot at step 820, entities with unknown locations one by one at step 825 undergo a swap test. The test is as follows. Another entity, with unknown location and assigned to a different subarea, is picked by chance (e.g., uniform distribution) in step 830. The current likelihood, and the likelihood after swap are calculated in step 835, and normalized as a binomial distribution in step 840. Then a Bernoulli sample is drawn using that distribution in step 845. If the outcome of that draw is "swap," then entities are swapped be adjusting the corresponding entity-subarea assignments in steps 855 and 860. If the outcome is the current assignment, no change is made.

In both cases, the process proceeds to the next entity by returning to step 825. Upon the completion of the above test for every entity (e.g., without known location) in every snapshot, the preference vector is calculated for every entity based on its assignments to subareas in corresponding snapshots in steps 865 and 870. The routine outputs the preference vectors, along with the entity-subarea assignments, for each snapshot in steps 875 and 880.

The adaptation of EM process for the localization purpose is illustrated in FIG. 9. This method, however, bears less accurate results compare to the process 800 of FIG. 8.

Steps 905, 910, 915, 920, and 925 are same as steps 805, 810, 815, 820, and 825 in FIG. 8. In step 930, for each entity without know location, all the location swaps with other entities are checked one by one. The change in log-likelihood due to such swaps is calculated in step 935, and the swap with largest positive change is selected and stored in steps 940 and 945. Corresponding to that swap, adjustments are made to the item-subarea assignments at step 950, and the new assignments are stored in step 955. Steps 960, 965, 970, and 975, are the same as steps 865, 870, 875, and 880 in FIG. 8.

FIG. 10 is the flowchart of the random initialization subroutine of steps 815, and 915. The process starts with reading a snapshot in step 1010. While there are still unassigned entities, the process continues with a feeling process. This process is as follows. Every subarea is checked to see if it has reached its associated headcount in the snapshot at step 1025. If the number of entities assigned to the subarea is smaller than its associated headcount, a random draw from the pool of unassigned entities in step 1030 determines the next assignment. Upon assigning all the entities in the snapshot to subareas, the subroutine concludes by storing the assignments in step 1035.

The above-described devices and subsystems of the illustrative embodiments can include, for example, any suitable servers, workstations, PCs, laptop computers, PDAs, Internet appliances, handheld devices, cellular telephones, wireless devices, other electronic devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, cable communications networks, satellite communications networks, G3 communications networks, Public Switched Telephone Network (PSTNs), Packet Data Networks (PDNs), the Internet, intranets, WiMax Networks, a combination thereof, and the like.

It is to be understood that the devices and subsystems of the illustrative embodiments are for illustrative purposes, as many variations of the specific hardware and/or software used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present invention. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, application processors, domain specific processors, application specific signal processors, and the like, programmed according to the teachings of the illustrative embodiments of the present invention, as will be appreciated by those skilled in the computer and software arts. Appropriate software can be readily prepared by programmers of ordinary skill based on the teachings of the illustrative embodiments, as will be appreciated by those skilled in the software art. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present invention can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (e.g., if processing is distributed) of the processing performed in implementing the illustrative embodiments. Computer code devices of the illustrative embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present invention can be distributed for better performance, reliability, cost, and the like.

As stated above, the devices and subsystems of the illustrative embodiments can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, flash memories, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention have been described in connection with a number of illustrative embodiments and implementations, the present invention is not so limited, but rather covers various modifications and equivalent arrangements, which fall within the purview of the appended claims.

What is claimed is:

1. A computer implemented system for locating entities in a compartmented area, the system comprising:
    a plurality of sensors devices distributed throughout a plurality of compartments of an area, respectively, and configured to locate entities within each of the compartments of the area;
    a check in and check out device for the area configured to capture check in and check out times and identities of the entities entering or leaving the area to generate entry and exit and identity information for the entities entering or leaving the area;
    a counting device configured to count over a period of time a number of the located entities within each of the compartments of the area based on information gathered by the sensors devices, and generate counting information over the period time of where and when the located entities were within each of the compartments;
    a syncing device configured to synchronize and generate snapshots of the entry and exit and identity information from the check in and check out device, and the counting information from the areas generated by the counting device;
    a localization server configured to generate prediction information including a location of the entities within each of the plurality of compartments based on the snapshots generated by the syncing device; and
    a display device configured to display the located entities within each of the compartments of the area based on the predication information generated by the localization server.

2. The system of claim 1, wherein the entities in the compartments of the area, include one of members in fitness clubs, guests in hotels, customers in warehouse stores, and objects in the compartments of the area.

3. The system of claim 1, wherein the system over time learns preferences of the entities located within the compartments in the area.

4. The system of claim 3, wherein based on the learned preferences for the entities, the system locates the entities within the compartments in the area.

5. The system of claim 1, wherein the system is configured to display entity counts within each of the compartments of the area.

6. The system of claim 1, wherein the system is configured to generate a list of the entities present in the entirety of the area.

7. A computer implemented method for locating entities in a compartmented area, the method comprising:
    distributing a plurality of sensors devices throughout a plurality of compartments of an area, respectively, and locating with the sensors entities within each of the compartments of the area;
    capturing with a check in and check out device for the area check in and check out times and identities of the entities entering or leaving the area and generating entry and exit and identity information for the entities entering or leaving the area;
    counting a period of time with a counting device a number of the located entities within each of the compartments of the area based on information gathered by the sensors devices, and generating counting information over the period time of where and when the located entities were within each of the compartments;
    synchronizing and generating with a syncing device snapshots of the entry and exit and identity information from the check in and check out device, and the counting information from the areas generated by the counting device;
    generating with a localization server prediction information including a location of the entities within each of the plurality of compartments based on the snapshots generated by the syncing device; and
    displaying with a display device the located entities within each of the compartments of the area based on the predication information generated by the localization server.

8. The method of claim 7, wherein the entities in the compartments of the area, include one of members in fitness clubs, guests in hotels, customers in warehouse stores, and objects in the compartments of the area.

9. The method of claim 7, further comprising over time learning preferences of the entities located within the compartments in the area.

10. The method of claim 9, wherein based on the learned preferences for the entities, locating the entities within the compartments in the area.

11. The method of claim 7, further comprising displaying entity counts within each of the compartments of the area.

12. The method of claim 7, further comprising generating a list of the entities present in the entirety of the area.

13. A computer program product for a computer implemented system for locating entities in a compartmented area, and including one or more computer readable instructions embedded on a non-transitory, tangible computer readable medium and configured to cause one or more computer processors to perform the steps of:
    distributing a plurality of sensors devices throughout a plurality of compartments of an area, respectively, and locating with the sensors entities within each of the compartments of the area;

capturing with a check in and check out device for the area check in and check out times and identities of the entities entering or leaving the area and generating entry and exit and identity information for the entities entering or leaving the area;

counting a period of time with a counting device a number of the located entities within each of the compartments of the area based on information gathered by the sensors devices, and generating counting information over the period time of where and when the located entities were within each of the compartments;

synchronizing and generating with a syncing device snapshots of the entry and exit and identity information from the check in and check out device, and the counting information from the areas generated by the counting device;

generating with a localization server prediction information including a location of the entities within each of the plurality of compartments based on the snapshots generated by the syncing device; and displaying with a display device the located entities within each of the compartments of the area based on the predication information generated by the localization server.

14. The computer program product of claim 13, wherein the entities in the compartments of the area, include one of members in fitness clubs, guests in hotels, customers in warehouse stores, and objects in the compartments of the area.

15. The computer program product of claim 13, further comprising over time learning preferences of the entities located within the compartments in the area.

16. The computer program product of claim 15, wherein based on the learned preferences for the entities, locating the entities within the compartments in the area.

17. The computer program product of claim 13, further comprising displaying entity counts within each of the compartments of the area.

18. The computer program product of claim 13, further comprising generating a list of the entities present in the entirety of the area.

* * * * *